(12) United States Patent
Morrison et al.

(10) Patent No.: US 8,537,134 B2
(45) Date of Patent: *Sep. 17, 2013

(54) SIZE/SCALE AND ORIENTATION DETERMINATION OF A POINTER IN A CAMERA-BASED TOUCH SYSTEM

(75) Inventors: Gerald Morrison, Calgary (CA); Trevor Akitt, Calgary (CA); Scott Su, Calgary (CA)

(73) Assignee: SMART Technologies ULC (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/554,044

(22) Filed: Jul. 20, 2012

(65) Prior Publication Data

US 2012/0280943 A1    Nov. 8, 2012

Related U.S. Application Data

(63) Continuation of application No. 12/482,841, filed on Jun. 11, 2009, now Pat. No. 8,228,304, which is a continuation of application No. 11/236,622, filed on Sep. 28, 2005, now Pat. No. 7,619,617, which is a continuation of application No. 10/294,917, filed on Nov. 15, 2002, now Pat. No. 6,954,197.

(51) Int. Cl.
*G06F 3/041* (2006.01)

(52) U.S. Cl.
USPC .......................................... 345/173; 345/178

(58) Field of Classification Search
USPC .............. 345/39, 156–184; 178/18.01–18.04; 250/221, 559.31; 348/39; 382/100; 701/26; 600/476
See application file for complete search history.

(56) References Cited

U.S. PATENT DOCUMENTS

| | | | |
|---|---|---|---|
| 4,639,720 A * | 1/1987 | Rympalski et al. | 345/174 |
| 4,843,568 A * | 6/1989 | Krueger et al. | 382/100 |
| 5,170,352 A * | 12/1992 | McTamaney et al. | 701/26 |
| 5,317,140 A * | 5/1994 | Dunthorn | 250/221 |
| 5,729,471 A * | 3/1998 | Jain et al. | 725/131 |
| 5,854,491 A * | 12/1998 | Pryor et al. | 250/559.31 |
| 6,304,263 B1 * | 10/2001 | Chiabrera et al. | 345/419 |
| 6,803,906 B1 * | 10/2004 | Morrison et al. | 345/173 |
| 7,084,859 B1 * | 8/2006 | Pryor | 345/173 |
| 7,176,905 B2 * | 2/2007 | Baharav et al. | 345/175 |
| 7,423,658 B1 * | 9/2008 | Uomori et al. | 345/660 |
| 2001/0019325 A1 * | 9/2001 | Takekawa | 345/157 |
| 2001/0026268 A1 * | 10/2001 | Ito | 345/175 |
| 2004/0202349 A1 * | 10/2004 | Erol et al. | 382/100 |
| 2005/0004472 A1 * | 1/2005 | Pratt | 600/476 |
| 2006/0202953 A1 * | 9/2006 | Pryor et al. | 345/156 |
| 2006/0274067 A1 * | 12/2006 | Hidai | 345/441 |

* cited by examiner

*Primary Examiner* — Prabodh M Dharia (74) *Attorney, Agent, or Firm* — Katten Muchin Rosenman LLP (57) ABSTRACT

A touch system includes a touch surface and at least two cameras associated with the touch surface. The at least two cameras acquire images of the touch surface from different locations and having overlapping fields of view. A digital signal processor is associated with each camera. The digital signal processors process pixel data acquired by selected pixel subsets of the at least two digital cameras to generate pointer characteristic data when a pointer exists in the acquired images. The pointer characteristic data identifies edges of the pointer. A master digital signal processor triangulates the edge information in the pointer characteristic data to determine a bounding area that represents a pointer perimeter.

13 Claims, 9 Drawing Sheets

SIZE/SCALE AND ORIENTATION DETERMINATION OF A POINTER IN A CAMERA-BASED TOUCH SYSTEM

This application is a continuation of U.S. patent application Ser. No. 12/482,841, filed Jun. 11, 2009, now U.S. Pat. No. 8,228,304, which is a continuation of U.S. patent application Ser. No. 11/236,622, filed Sep. 28, 2005, now U.S. Pat. No. 7,619,617, which is a continuation of U.S. patent application Ser. No. 10/294,917, filed Nov. 15, 2002, now U.S. Pat. No. 6,954,197, the contents of which are incorporated herein by reference.

FIELD OF THE INVENTION

The present invention relates generally to camera-based touch systems and in particular to a method of determining the size/scale and orientation of a pointer in a camera-based touch system and to a camera-based touch system employing pointer size/scale and orientation determination.

BACKGROUND OF THE INVENTION

Camera-based touch systems that use optical recording devices such as cameras to acquire images of a touch surface and process the image data to determine the position of a pointer relative to the touch surface are known. For example, International PCT Application No. WO 02/03316 to Smart Technologies Inc. et al discloses a camera-based touch system including a touch surface and a plurality of cameras associated with the touch surface. The cameras have overlapping fields of view encompassing the touch surface. The cameras acquire images of the touch surface from different locations and generate image data. Processing circuitry receives and processes the image data generated by the cameras to determine the location of a pointer captured in the images relative to the touch surface using triangulation.

In particular, a processor associated with each camera receives the image data generated by the camera and processes the image data to detect the existence of the pointer in the image. Pointer information packets (PIPs) are generated by the camera processors when the pointer exists in the captured images. The PIPs, among other things, identify the pointer and either its tip or its median line. The tip or median line data in the PIPs is then processed by a master controller to determine the position of the pointer relative to the touch surface using triangulation.

Although the above-identified camera-based touch system provides significant advantages over other types of prior art passive touch systems such as analog resistive, surface acoustic wave and capacitive touch systems, improvements are always desired. Since the above-described camera-based touch system uses single point triangulation to determine the position of the pointer relative to the touch surface, resolution is limited. In addition, the camera-based touch system does not readily provide for resolution of pointer ambiguity. Accordingly, there is a need for an improved camera-based touch system.

It is therefore an object of the present invention to provide a novel method of determining the size/scale and orientation of a pointer in a camera-based touch system and to a camera-based touch system employing pointer size/scale and orientation determination.

SUMMARY OF THE INVENTION

According to one aspect of the present invention there is provided a touch system comprising:

at least two optical devices associated with a touch surface, said at least two optical recording devices acquiring images of said touch surface from different locations and having overlapping fields of view; and processing circuitry processing image data acquired by said at least two optical recording devices to detect edges of a pointer in said images and to triangulate the detected edges to determine a bounding area that defines a pointer perimeter.

Preferably, the processing circuitry further determines the center of the bounding area thereby to determine the center of the pointer. It is also preferred that the processing circuitry examines the shape of the bounding area to determine the orientation of the pointer relative to the touch surface.

In one embodiment, the touch surface is generally rectangular and an optical recording device is positioned adjacent each corner of the touch surface. The processing circuitry triangulates detected edges in images captured by multiple pairs of optical recording devices to yield multiple bounding areas. The smallest bounding area is selected as the bounding area defining the pointer perimeter. The processing circuitry averages the centers of the multiple bounding areas to determine the center of the pointer.

In a preferred form, the optical recording devices are CMOS digital cameras having selectable pixels arrays. Pixel data from subsets of the pixel arrays is processed by the processing circuitry. The processing circuitry includes a camera processor associated with each digital camera to process pixel data and detect edges of the pointer. A master processor triangulates the detected edges to yield the multiple bounding areas and selects the smallest bounding area as the bounding area representing the pointer perimeter.

Preferably pixel data at least from pixel rows capturing the region of the pointer in contact with the touch surface is processed to determine the bounding area. It is further preferred that pixel data from pixel rows capturing regions of the pointer along its length are processed to yield a series of bounding areas, the bounding areas being stacked to generate a volumetric representation of the pointer.

In another embodiment, the processing circuitry superimposes a model over the bounding area with the model defining the pointer perimeter. The processing circuitry examines parameters of the model thereby to determine the center or tip location of the pointer. The model may take the form of a rectangular box centered over the bounding area.

According to another aspect of the present invention there is provided a touch system comprising:

at least two digital cameras associated with a touch surface, said at least two digital cameras acquiring images of said touch surface from different locations and having overlapping fields of view; and processing circuitry processing pixel data acquired by said at least two digital cameras to detect edges of a pointer in said images and to triangulate the detected edges to determine at least one bounding area that represents a pointer perimeter.

According to yet another aspect of the present invention there is provided a touch system comprising:

a touch surface;

at least two cameras associated with said touch surface, said at least two cameras acquiring images of said touch surface from different locations and having overlapping fields of view;

a digital signal processor associated with each camera, the digital signal processors associated with said at least two cameras processing pixel data acquired by selected pixel subsets of the at least two digital cameras to generate pointer characteristic data when a pointer exists in said acquired images, said pointer characteristic data identifying edges of said pointer; and a master digital signal processor triangulating the edge information in said pointer characteristic data to determine a bounding area defining a pointer perimeter.

According to still yet another aspect of the present invention there is provided a method of detecting the perimeter of a pointer relative to a touch surface comprising the steps of:

acquiring multiple images of a pointer relative to said touch surface;

processing pixel data resulting from said images to detect edges of said pointer; and triangulating the detected edges to determine a bounding area representing said perimeter.

According to still yet another aspect of the present invention there is provided a method of erasing electronic ink presented on a touch surface in response to movement of a pointer over said touch surface, said method comprising the steps of:

tracking movement of said pointer over said touch surface;

determining the perimeter of the pointer that is in contact with said touch surface; and erasing electronic ink contacted by said determined perimeter.

Since two or more cameras acquire an image of the pointer when the pointer is adjacent the touch surface, the edge co-ordinates of the pointer generated by each camera define a bounding area that represents the pointer perimeter. The size and the orientation of the bounding area allows the size and orientation of the pointer to be determined. In addition, parameters of the bounding area can be used to determine the center or tip location of the pointer. Using this bounding area data to locate the pointer tip provides increased pointer position determination accuracy than is achievable using single point triangulation. This is due to the fact that by selecting the minimum bounding area, noise in the captured images that can create jitter, is reduced.

The present invention provides further advantages in that when more than two cameras are used, if one of the triangulation camera pairs yields a poor bounding area result, the other triangulation camera pairs are automatically used to determine the bounding area.

BRIEF DESCRIPTION OF THE DRAWINGS

Embodiments of the present invention will now be described more fully with reference to the accompanying drawings in which.

DETAILED DESCRIPTION OF THE PREFERRED EMBODIMENTS

Figure 1:
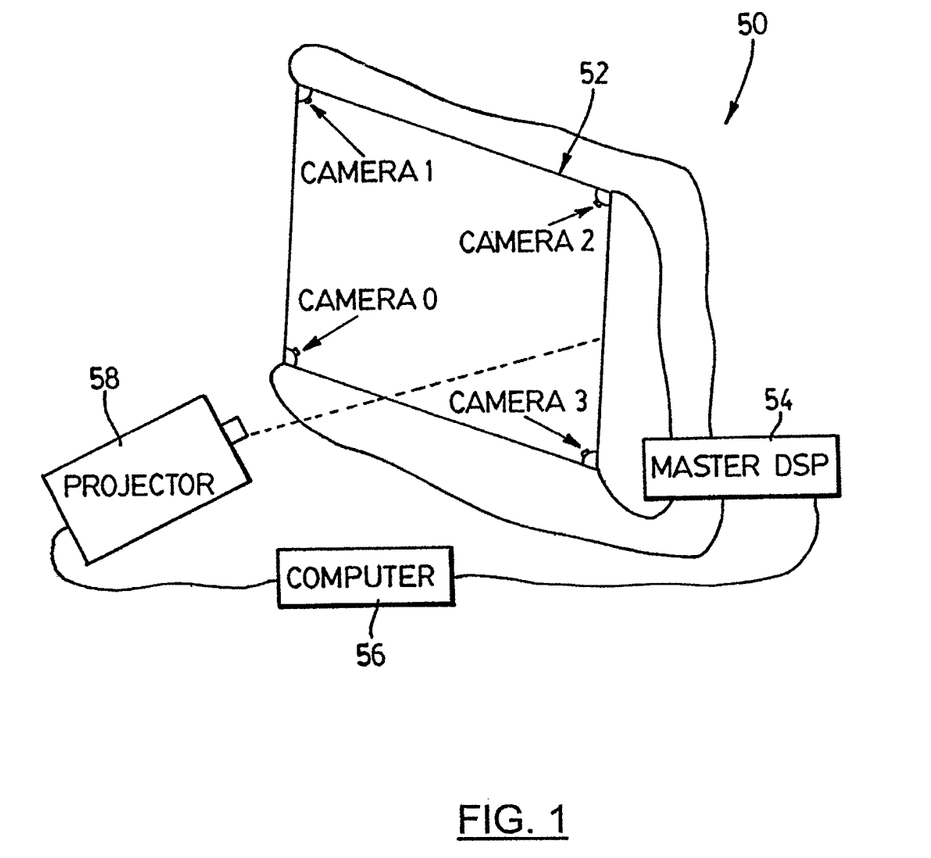
FIG. 1 is a schematic diagram of a camera-based touch system in accordance with the present invention.

Turning now to FIG. 1, a camera-based touch system such as that described in International PCT No. WO 02/03316 filed on Jul. 5, 2001, assigned to the assignee of the present invention, the contents of which are incorporated herein by reference, is shown and is generally identified by reference numeral 50. As can be seen, touch system 50 includes a touch screen 52 coupled to a digital signal processor (DSP) based master controller 54. Master controller 54 is also coupled to a computer 56. Computer 56 executes one or more application programs and provides display output that is presented on the touch screen 52 via a projector 58. The touch screen 52, master controller 54, computer 56 and projector 58 form a closed-loop so that user contacts with the touch screen 52 can be recorded as writing, drawing or erasing or can be used to control execution of application programs executed by the computer 56. In the case of writing or drawing, electronic ink corresponding to pointer movement over the touch screen is presented. In the case of erasing, presented electronic ink contacted by the pointer is removed.

Figures 2, 3:
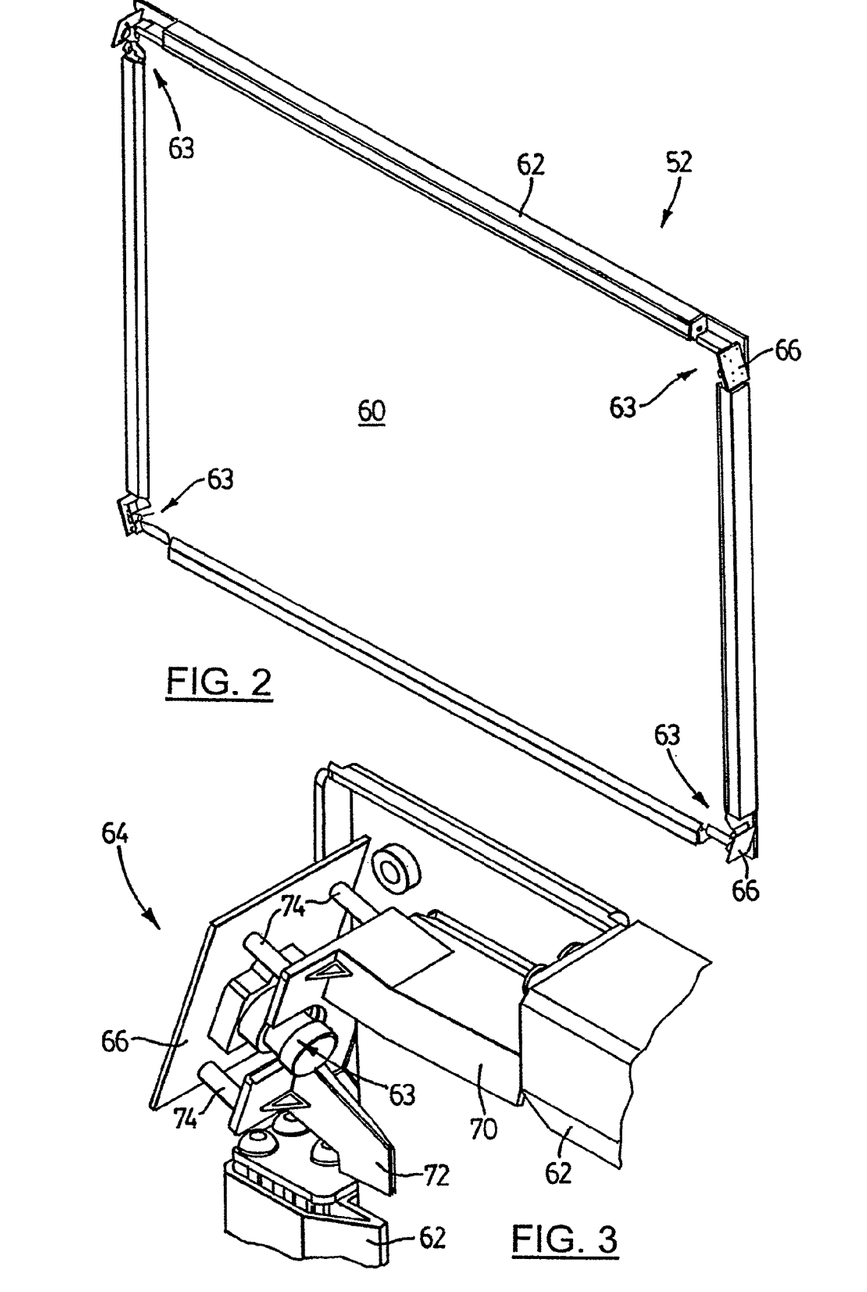
FIG. 2 is an isometric view of a touch screen forming part of the touch system of FIG. 1.
FIG. 3 is an isometric view of a corner portion of the touch screen of FIG. 2.
Figure 4:
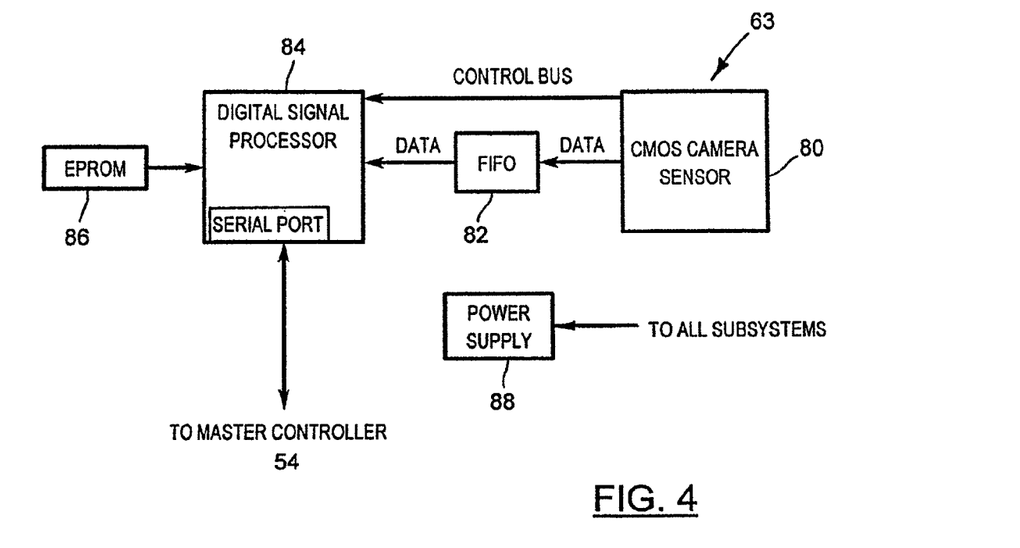
FIG. 4 is a schematic diagram of a digital camera forming part of the touch screen of FIG. 2.

FIGS. 2 to 4 better illustrate the touch screen 52. Touch screen 52 includes a touch surface 60 bordered by a rectangular frame or bezel 62. Touch surface 60 is in the form of a rectangular planar sheet of passive material but may in fact be any suitable surface. Optical recording devices in the form of DSP-based CMOS digital cameras $63_0$ to $63_3$ are positioned adjacent each corner of the touch screen 52. Each digital camera $63_N$ is mounted on a frame assembly 64. Each frame assembly 64 includes an angled support plate 66 on which the digital camera $63_N$ is mounted. Supporting frame elements 70 and 72 are mounted on the plate 66 by way of posts 74 and secure the plate 66 to the frame 62.

Each digital camera $63_N$ includes a two-dimensional CMOS image sensor 80 having an associated lens assembly, a first-in-first-out (FIFO) buffer 82 coupled to the image sensor 80 by a data bus and a digital signal processor (DSP) 84 coupled to the FIFO 82 by a data bus and to the image sensor 80 by a control bus. A boot EPROM 86 and a power supply subsystem 88 are also included.

In the present embodiment, the CMOS camera image sensor 80 is a National LM9617 image sensor configured for a 640×20 pixel subarray that can be operated to capture image frames at rates in excess of 200 frames per second. Arbitrary pixel rows of the image sensor 80 can be selected. Since the pixel rows can be arbitrarily selected, the pixel subarray can be exposed for a greater duration for a given digital camera frame rate providing for good operation in darker rooms in addition to well lit rooms. The FIFO buffer 82 is manufactured by Cypress under part number CY7C4211V and the DSP 84 is manufactured by Analog Devices under part number ADSP2185M.

The DSP 84 receives and processes image frames from the image sensor 80 to determine the edges of a pointer within the image frames. In addition, the DSP 84 provides control information to the image sensor 80 via the control bus. The control information allows the DSP 84 to control perimeters of the image sensor 80 such as exposure, gain, array configuration, reset and initialization. The DSP 84 also provides clock signals to the image sensor 80 to control the frame rate of the image sensor 80.

Figure 6:
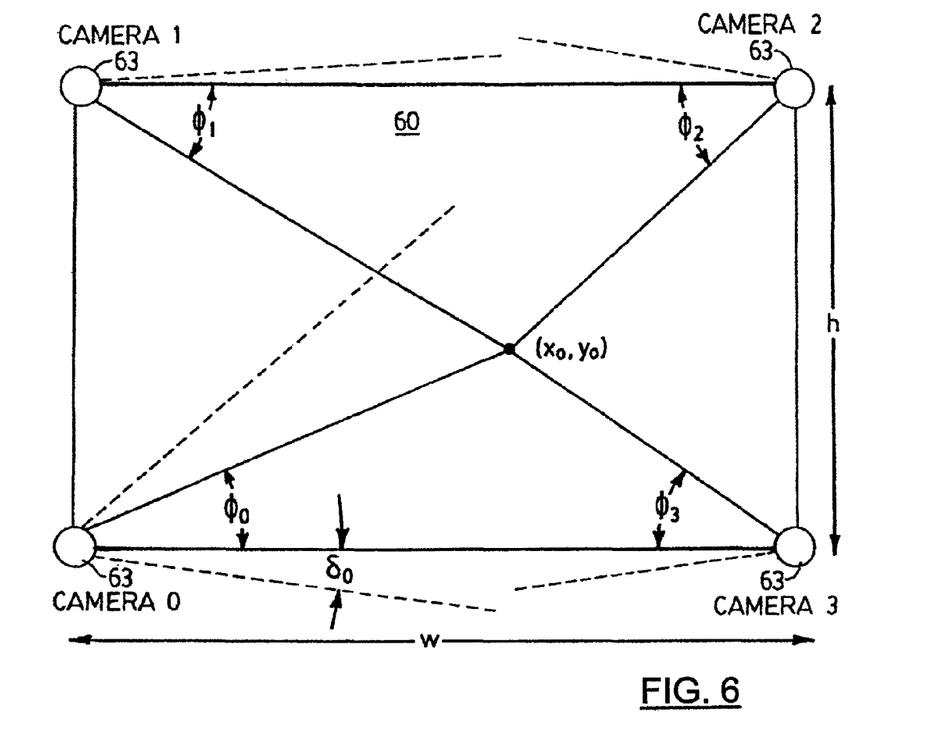
FIG. 6 shows triangulation geometry used to calculate a pointer contact position on the touch surface of the touch screen.

The angle of the plate 66 and the optics of the digital cameras $63_N$ are selected so that the field of view (FOV) of each digital camera $63_N$ is slightly beyond 90°. In this way, the entire touch surface 60 is within the field of view of each digital camera $63_N$ with the field of view of each digital camera $63_N$ extending slightly beyond a designated peripheral edge of the touch surface 60 as shown in FIG. 6.

Figure 5:
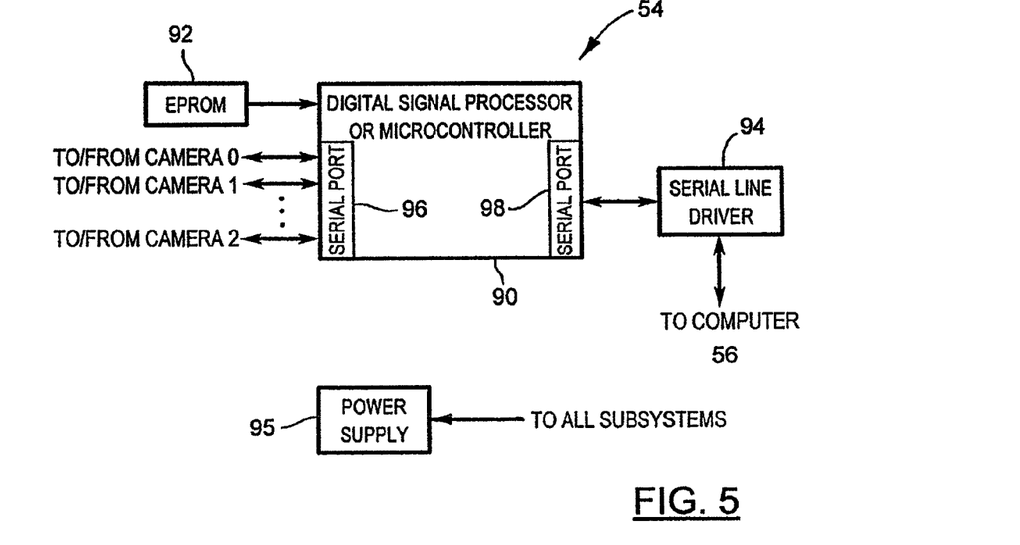
FIG. 5 is a schematic diagram of a master controller forming part of the touch system of FIG. 1.

Master controller 54 is best illustrated in FIG. 5 and includes a DSP 90, a boot EPROM 92, a serial line driver 94 and a power supply subsystem 95. The DSP 90 communicates with the DSPs 84 of the digital cameras $63_0$ to $63_3$ over a data bus via a serial port 96 and communicates with the computer 56 over a data bus via a serial port 98 and the serial line driver 94. In this embodiment, the DSP 90 is manufactured by Analog Devices under part number ADSP2185M. The serial line driver 94 is manufactured by Analog Devices under part number ADM222.

The master controller 54 and each digital camera $63_N$ follow a communication protocol that enables bi-directional communications via a common serial cable similar to a universal serial bus (USB). The transmission bandwidth is divided into thirty-two (32) 16-bit channels. Of the thirty-two channels, six (6) channels are assigned to each of the DSPs 84 in the digital cameras $63_0$ to $63_3$ and to the DSP 90 in the master controller 54 and the remaining two (2) channels are unused. The master controller 54 monitors the twenty-four (24) channels assigned to the DSPs 84. The DSPs 84 monitor the six (6) channels assigned to the DSP 90 of the master controller 54. Communications between the master controller 54 and the digital cameras $63_0$ to $63_3$ are performed as background processes in response to interrupts.

The operation of the touch system 50 will now be described. Initially, a camera offset angle calibration routine is performed to determine the offset angle δ of each digital camera $63_N$ (see FIG. 6). Details of the camera offset angle calibration are described in Applicants' co-pending U.S. application Ser. No. 09/870,698 entitled "Calibrating Camera Offsets to Facilitate Object Position Determination Using Triangulation" filed on Jun. 1, 2001, the contents of which are incorporated herein by reference.

With the touch system 50 calibrated, each digital camera $63_N$ acquires image frames of the touch surface 60 within the field of view of its image sensor 80 at a desired frame rate and loads the pixel data associated with the selected pixel subarray into the FIFO buffer 82. The DSP 84 in turn reads the pixel data from the FIFO buffer 82 and processes the pixel data to determine if a pointer exists in the image frame.

If a pointer is in the acquired image frame, the pixel data is further processed by the DSP 84 to determine the edges of the pointer visible to the digital camera $63_N$ in each pixel row of the subarray. In the present embodiment, a combination of image contrast with a differentiating edge detector is used. Specifics concerning edge detection can be found in "The Image Processing Handbook", Fourth Edition by John C. Russ, CRC Press, Publication Date: Jul. 26, 2002, Chapter 4: Image Enhancement and in "Algorithms for Image Processing and Computer Vision" by J. R. Parker, Wiley Computer Publishing, Publication Date: 1997, Chapter 1: Advanced Edge Detection Techniques. The z-position of the pointer is also determined so that a determination can be made as to whether the pointer is contacting or hovering above the touch surface 60. Pointer information packets (PIPs), including the pointer edge and contact or hover data, status and/or diagnostic information, are then generated by the DSP 84 and the PIPs are queued for transmission to the master controller 54. The digital cameras $63_0$ to $63_3$ also receive and respond to command PIPs generated by the master controller 54.

The master controller 54 polls the digital cameras $63_0$ to $63_3$ for PIPs in the queues. In this particular embodiment, the master controller 54 polls the digital cameras at a rate exceeding the image sensor frame rates. Upon receipt of PIPs from the digital cameras $63_N$, the master controller 54 examines the PIPs to determine if the PIPs include pointer edge data. If the PIPs include pointer edge data, the master controller 54 triangulates the pointer edge data in the PIPs to determine bounding areas in which the pointer is located.

During triangulation, triangulation is performed in respect of each pair of cameras capturing images of the pointer with the exception of the diagonal digital camera pairs and for each pixel row to yield a plurality of bounding areas. The minimum bounding area, which may range from a four-sided polygon to an eight-sided polygon, for each pixel row is then selected to reduce the effects of erroneous or suboptimal measurements. Once the minimum bounding area for each pixel row has been selected, a model, in the present embodiment a rectangular box whose size is a function of the size of the minimum bounding area, is superimposed on the bounding area and defines the pointer perimeter and hence pointer size at that pixel row. The size of the box describes the pointer size in terms of pixels by height and width.

In order to determine the centre of the pointer at a selected pixel row, the parameters of the model such as its center, superimposed on each bounding area is determined and the centers are averaged to determine the pointer center in sub-pixel accuracy.

The size and orientation of the model superimposed on the smallest bounding area for each pixel row is used by the master controller 54 to determine the size and orientation of the pointer. Knowing the size of pointer helps to reduce pointer ambiguity. If there is prior knowledge concerning the pointer size, then the acquired bounding areas can be used to identify quickly potential pointers from other objects captured in the camera images. Objects that are too large or too small as compared to the historical pointer size can be discarded as erroneous.

Knowing the orientation of the pointer can be important depending on the shape of the pointer. If the bounding area is circular, the pointer is a cylindrical and pointer orientation is not important. However, if the bounding area is rectangular in shape then pointer orientation becomes important. For example in the case of a pointer in the form of a standard rectangular chalk board eraser, if the longest side of the rectangular eraser runs up and down, then it can be determined that the eraser is held in a vertical orientation. Likewise if the longest side of the rectangular eraser runs left to right, then it can be determined that the eraser is held in a horizontal orientation. Being able to determine pointer orientation is particularly beneficial when performing an erasing function since erasing can be limited to the pointer perimeter contacting the touch surface regardless of the pointer size. This is substantially different from single point contact touch systems that erase a predefined area surrounding a touch surface contact irrespective of pointer size and orientation.

The master controller 54 also calculates a volumetric representation of the pointer by examining the model superimposed on the minimum bounding area associated with each pixel row of the subarray. Changes in size of the model enable the configuration of the pointer to be determined. For example, in the case of a conical pointer, the pixel row capturing pixel data associated with the tip of the pointer, yields a small bounding area and an equally small model. Pixel rows capturing pixel data associated with the pointer body away from the pointer tip, yield larger bounding areas as the pointer broadens and therefore equally larger models. This change in model size allows the master controller 54 to determine the conical configuration of the pointer.

In the case of a pointer such as a finger that has a generally cylindrical shape, especially when the finger is pressed and flattened against the touch surface, the pixel rows capturing pixel data along the length of the finger, yield bounding areas and corresponding models that are basically the same size. This allows the master controller 54 to determine the cylindrical configuration of the pointer. As will be appreciated, by stacking the bounding areas or models generated for a series of pixel rows, a three-dimensional volumetric representation of the pointer can be constructed allowing the pointer type to be determined.

Once the master controller 54 has determined the pointer perimeter and the pointer orientation, the master controller 54 transmits the calculated pointer perimeter and orientation data, status and/or diagnostic information to the computer 56. In this manner, the pointer perimeter and orientation data transmitted to the computer 56 can be recorded as writing, drawing or erasing or can be used to control execution of application programs executed by the computer 56. The computer 56 also updates the display output conveyed to the projector 58 so that information presented on the touch surface 60 reflects the pointer activity. The master controller 54 also receives commands from the computer 56 and responds accordingly as well as generates and conveys command PIPs to the digital cameras $63_N$.

Figure 7:
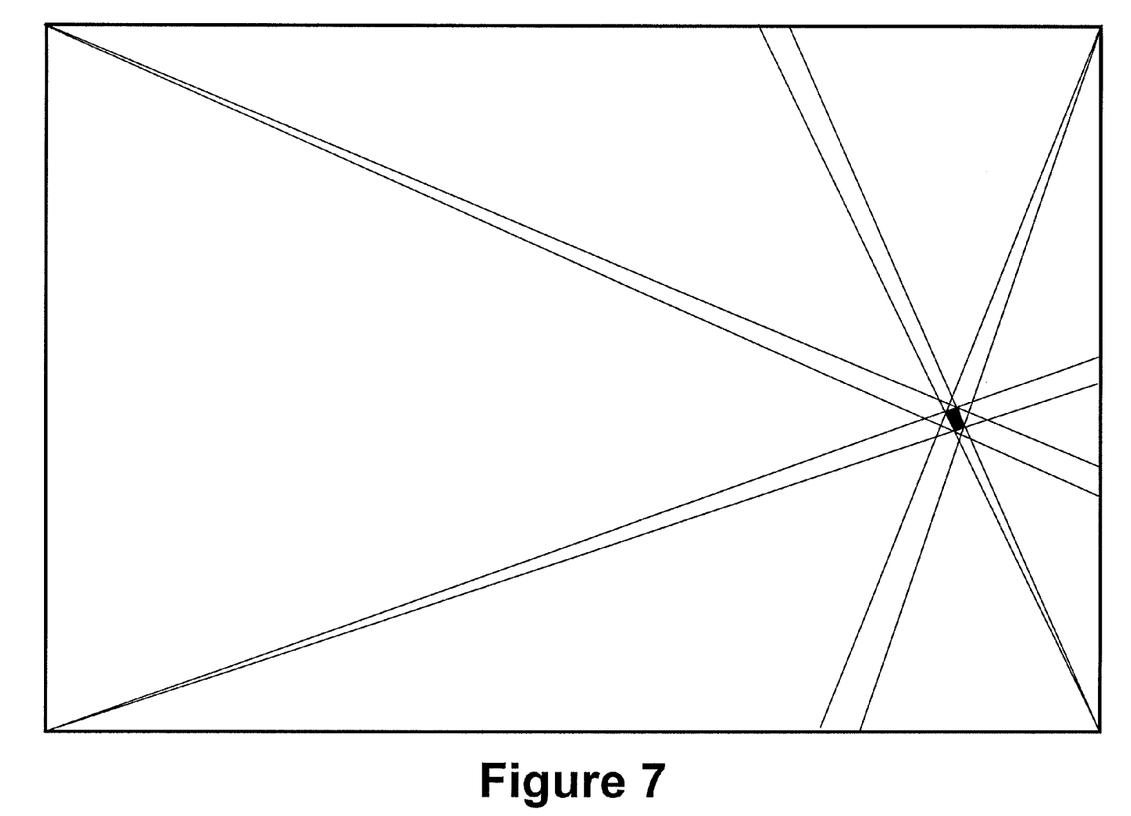
FIGS. 7 to 9 are graphical representations of overlapping triangulated pointer edges defining bounding areas generated in response to contacts on the touch surface using different type pointers, models in the form of shaded rectangular boxes being superimposed on the bounding areas.
Figure 8:
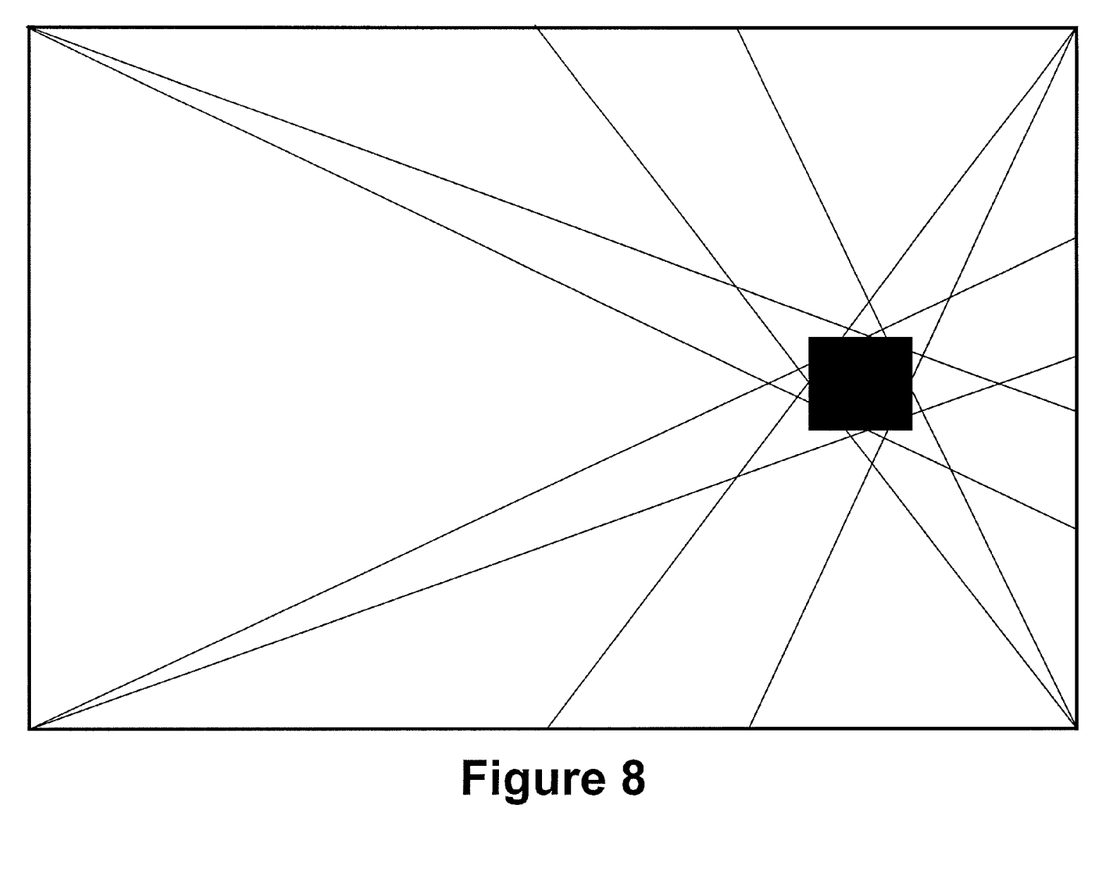
Figure 9:
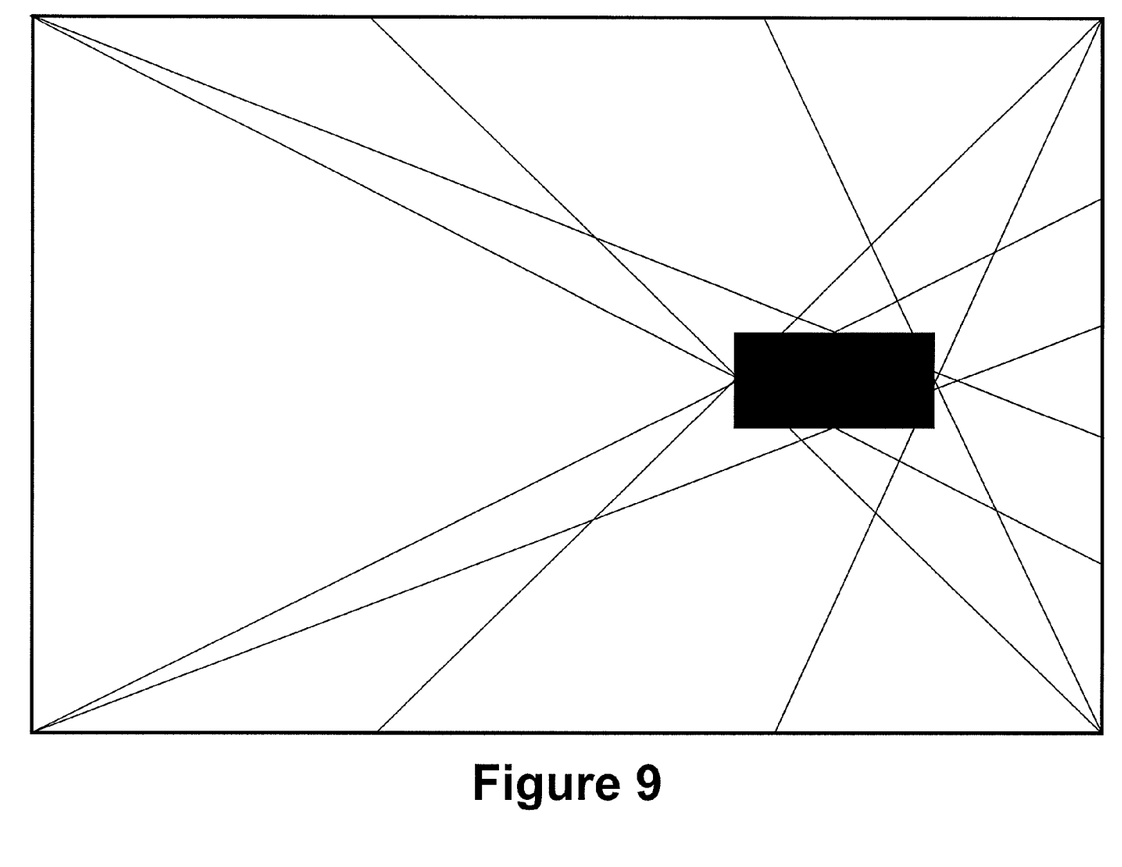

Turning now to FIGS. 7 to 9, graphical representations of overlapping triangulated edges defining bounding areas are shown. As can be seen, the bounding areas are not box-shaped but actually take the form of multi-sided polygons with the number of sides of the polygons ranging from four when using PIPs generated by a pair of cameras to eight when using PIPs generated by four cameras. In FIG. 7, the bounding area is generated as a result of a finger contacting the touch surface. In FIG. 8, the bounding area is generated as a result of a hockey puck contacting the touch surface. In FIG. 9, the bounding area is generated as a result of a rectangular eraser contacting the touch surface with the longest side of the eraser being in the horizontal orientation. As will be appreciated, this Figure clearly shows how pointer orientation can be used and in this case defines an erase tool perimeter of the correct size and orientation.

Figure 10:
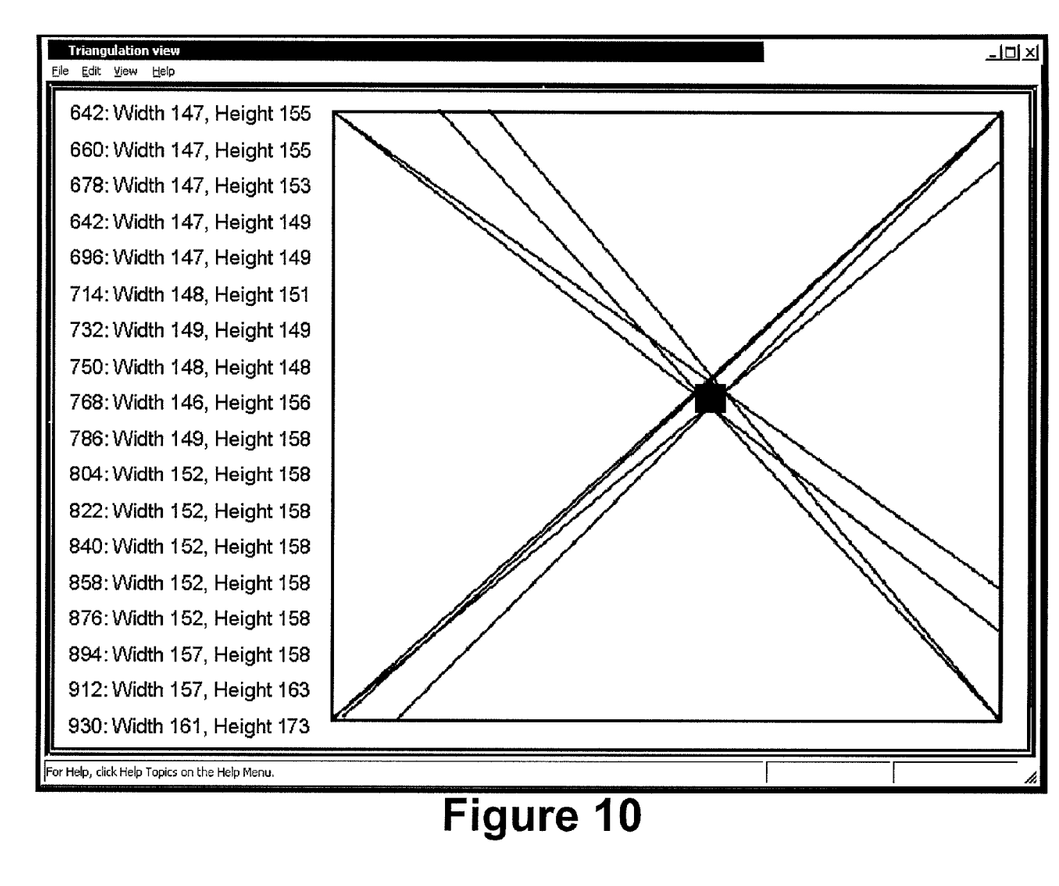
FIGS. 10 and 11 are screen shots generated by a diagnostic program showing the size, orientation and relative scale of different pointers contacting the touch surface.
Figure 11:
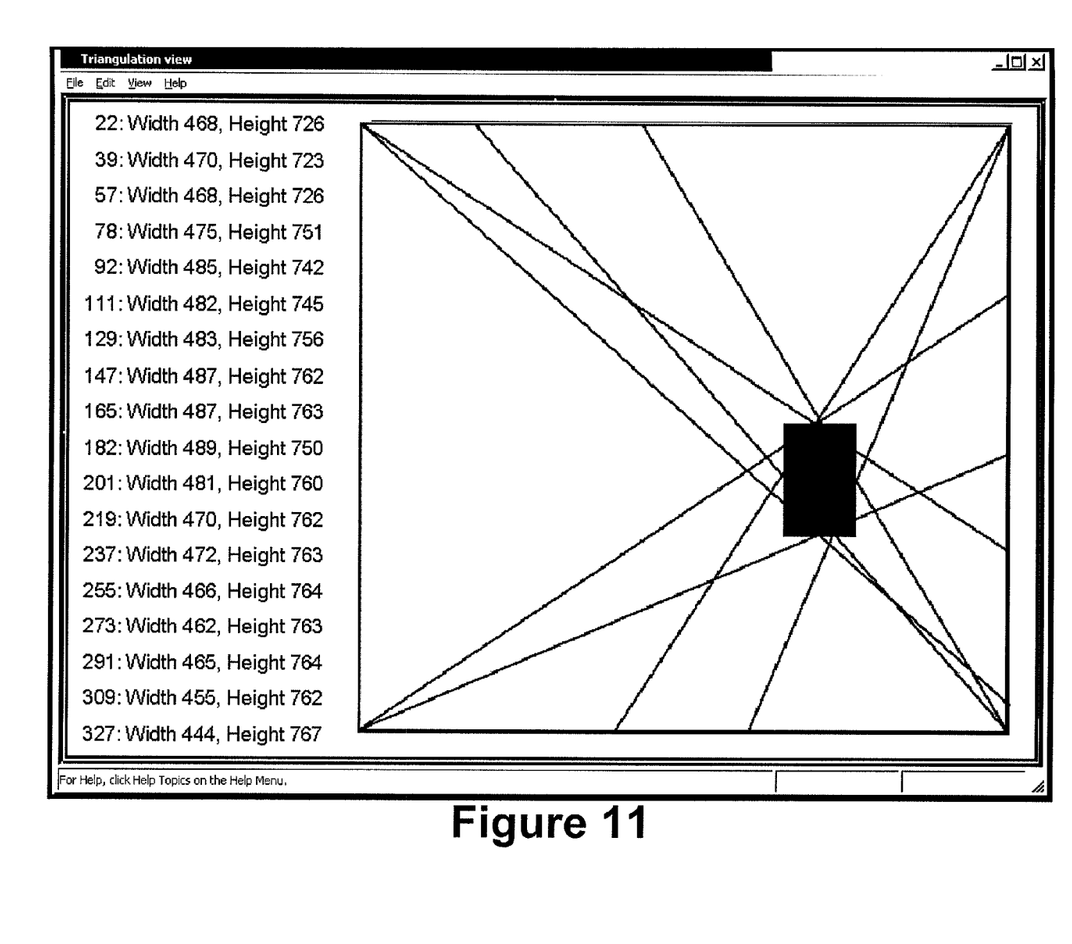

FIGS. 10 and 11 are screen shots generated by a diagnostic program showing the size, orientation and relative scale of different pointers contacting the touch surface. In particularly, FIG. 10 shows a small pointer of uniform width and height contacting the touch surface. The size of the pointer is 161×173 pixels. FIG. 11 shows a different pointer in contact with the touch surface. The size of the pointer in this case is 444×767 pixels.

Although a box-shaped rectangular model is shown superimposed over the bounding areas, those of skill in the art will appreciate that other model shapes may be used. Alternatively, the shapes of the bounding areas may be used to define the pointer perimeters. The center of the pointer can likewise be calculated by averaging the centers of the bounding areas. Also, although the master controller is shown as a separate processor, one of the camera processors may perform the master controller function and receive PIPs from the other camera processors.

As previously described in order to generate a three-dimensional volumetric representation of the pointer, the bounding area or model associated with each pixel row of the subarray is placed in a stack and the sizes of the bounding areas or models are compared. Of course only selected bounding areas or models need be examined. Also, if only pointer contact with the touch surface is of concern, triangulation need only be performed for the pixel row looking directly along the touch surface. In this manner, only the pointer perimeter at the touch surface contact point is defined.

Although preferred embodiments of the present invention have been described, those of skill in the art will appreciate that variations and modifications may be made without departing from the spirit and scope thereof as defined by the appended claims.

What is claimed is:

1. A method comprising:
acquiring images of a pointer proximate an input surface from different vantages;
processing pixel data of one of said images to determine at least a first pair of edges of said pointer and processing pixel data of another of said images to determine at least a second pair of edges of said pointer;
triangulating an input area of said pointer based on said determined first and second pairs of edges;
creating at least one boundary representing said pointer in at least one pixel row; and
using the at least one boundary to determine pointer type information.

2. The method of claim 1 further comprising using the triangulated input area to control execution of an applications program.

3. The method of claim 2 further comprising updating a computer generated image presented on said input surface.

4. The method of claim 3 further comprising determining the center of the input area thereby to determine the center of said pointer.

5. The method of claim 3 further comprising examining the shape of the input area to determine the orientation of said pointer relative to said input surface.

6. The method of claim 4 further comprising examining the shape of the input area to determine the orientation of said pointer relative to said input surface.

7. The method of claim 1 wherein said input surface is generally rectangular, wherein said acquiring comprises acquiring an image looking generally across said input surface from each corner of said input surface, wherein said processing comprises processing pixel data of each image to detect at least a pair of edges of said pointer, and wherein said triangulating comprises triangulating an input area based on said determined edges for each different pair of images and using the smallest triangulated input area to represent the size of said pointer.

8. The method of claim 7 further comprising averaging the centers of the triangulated input areas to determine the center of said pointer.

9. The method of claim 1 wherein said processing is performed at a rate greater than the rate at which said images are acquired.

10. The method of claim 1 further comprising superimposing a model over said triangulated input area.

11. The method of claim 10 further comprising determining the center of said model thereby to determine the center of said pointer.

12. The method of claim 10 further comprising examining the size of said model to identify non-pointer input.

13. The method of claim 1 further comprising:
creating a volumetric representation of the pointer using a plurality of the boundaries in a plurality of the pixel rows; and using the volumetric representation of the pointer to determine the pointer type information.

* * * * *